Sept. 10, 1963  J. F. PAULSEN  3,103,348
RESILIENT CONNECTING SYSTEMS
Filed Aug. 11, 1961  3 Sheets-Sheet 1

Sept. 10, 1963   J. F. PAULSEN   3,103,348
RESILIENT CONNECTING SYSTEMS
Filed Aug. 11, 1961   3 Sheets-Sheet 2

Sept. 10, 1963 J. F. PAULSEN 3,103,348
RESILIENT CONNECTING SYSTEMS
Filed Aug. 11, 1961 3 Sheets-Sheet 3
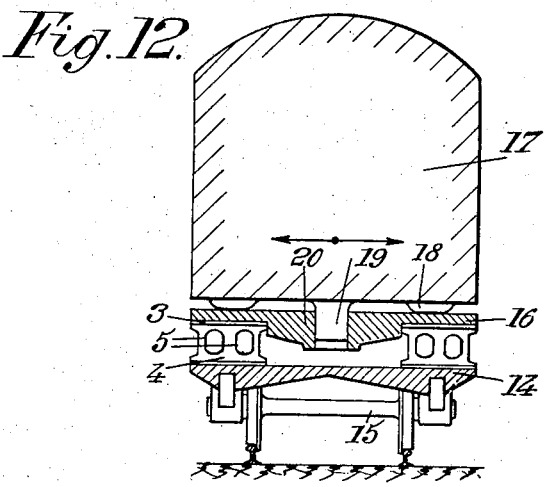
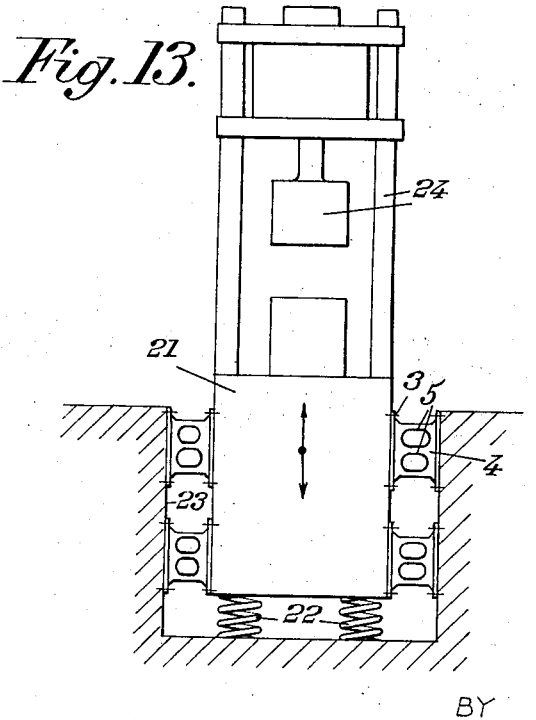
INVENTOR
BY
ATTORNEY … # 3,103,348
Patented Sept. 10, 1963

3,103,348
RESILIENT CONNECTING SYSTEMS
Jean Felix Paulsen, Paris, France, assignor to Luxembourgeoise de Brevets & de Participations, a society of France
Filed Aug. 11, 1961, Ser. No. 130,961
Claims priority, application France Aug. 12, 1960
2 Claims. (Cl. 267—1)

The present invention relates to resilient connecting systems interposed between two parts for guiding and shock absorbing purposes in such manner that said parts may have small relative displacements on either side of a mean relative position toward which they are urged resiliently, while being kept at a practically constant distance from each other, such systems being further capable of at least partly preventing the transmission of vibrations from one of the parts to the other.

The chief object of this invention is to provide a system of this kind, which is better adapted to meet the requirements of practice than those known of this time, in particular to obtain a great rigidity in the direction along which is measured the distance between said parts and a high flexibility of displacement in at least one direction perpendicular to this first mentioned direction.

According to my invention, such a system comprises the following elements:

Two rigid members secured in a rigid manner to said two parts respectively,

Two cushion elements of rubber or of an elastomer material, each made adherent to one of said members, said cushion elements facing each other, And at least two rigid bodies each interposed between these two cushion elements and each made adherent to both of them along curved surfaces having each a rolling axis (or center), The whole being arranged in such manner that the only possible displacements of one of the parts with respect to the other maintain their distance practically constant and produce identical rolling movements of small amplitude of the rigid bodies about their axes (or centers), the two curved surfaces belonging to every rigid body preferably having a single rolling axis and being joined to each other by side walls advantageously plane and parallel to each other, each of said side walls being preferably connected to the opposite side wall of the next rigid body through a mass of rubber or elastomer material made adherent to both of the side walls that it serves to connect together.

A preferred embodiment of my present invention will be hereinafter described with reference to the accompanying drawings, given merely by way of example and in which:

FIG. 1 diagrammatically shows a machine supported by resilient connecting systems made according to the invention;

FIG. 12 is a transverse vertical section of a railway vehicle mounted on a truck provided with a system according to the invention;

FIG. 13 diagrammatically shows a power-hammer mounted on systems according to the invention.

Figure 1:
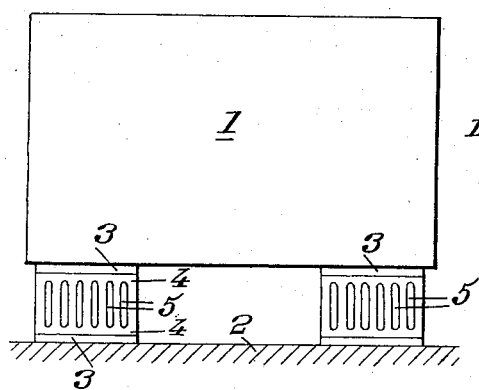

It will first be supposed, as shown by FIG. 1, that a machine 1 is to be mounted on a frame 2 in such manner that this machine may have horizontal displacements on either side of a mean position toward which it is resiliently urged while remaining constantly at the same height, and on the other hand that the vibrations of said machine are not to be transmitted to a substantial degree to the frame (or inversely).

Figure 2:
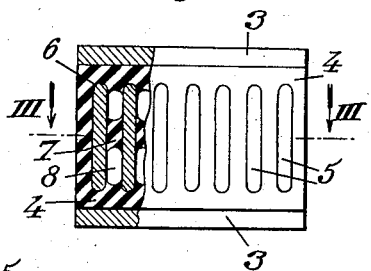
FIG. 2 is a view, partly in elevation and partly in vertical section, of one of these systems shown on an enlarged scale.

I interpose, between machine 1 and frame 2, at least one connecting system comprising the following elements:

Two rigid plates 3 (FIGS. 1 and 2) fixed respectively, opposite each other, to machine 1 and to frame 2;

Two cushion elements 4 of rubber or an analogous resilient material made adherent to said plates on the respective faces thereof turned toward each other;

And at least two identical rigid bodies 5 disposed side by side, parallelly to each other, between the two cushion elements 4 to which their ends are made adherent.

The surfaces 6 of bodies 5 along which these bodies are made adherent to cushion elements 4 are curved and each have:

Either a horizontal rolling axis, said bodies being in the form of plates two opposed edges of which have a convex rounded cross section;

Or a rolling center, said bodies being then in the form of pins the ends of which are in the form of portions of spheres.

Figure 3:
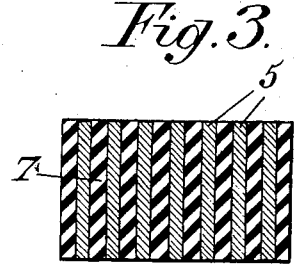
FIG. 3 is a horizontal section on the line III—III of FIG. 2.

In the first case (FIGS. 2 and 3), the upper plate 3 can move, with respect to the lower plate, only in one horizontal direction, which is perpendicular to the rolling axes of surfaces 6.

Figure 4:
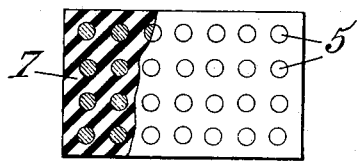
FIG. 4 is a view similar to FIG. 3, but showing a modification.

In the second case (FIGS. 2 and 4) the upper plate 3 can move, with respect to the lower plate, in any horizontal direction.

Every horizontal displacement of the upper plate produces a rolling without slipping of surfaces 6 on the corresponding cushion elements 4 respectively, so that these cushion elements are respectively deformed.

Figure 11:
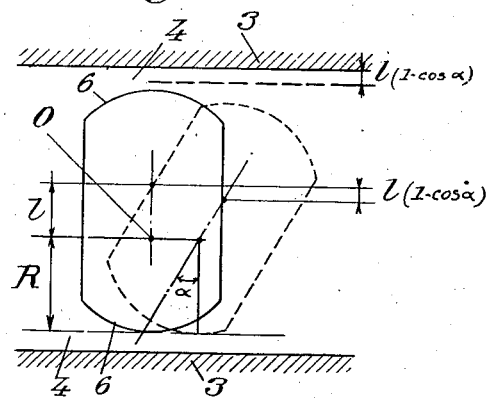
FIG. 11 is a diagrammatical view illustrating the principle of operation of the system according to the invention.

Surfaces 6 move by turning upon themselves about their rolling axes (or centers) (designated by O on FIG. 11) in such manner that each of said axes (or centers) remains at a constant distance from the corresponding plate 3 and moves, parallelly to said plate, a distance equal to $R \sin \alpha$ if R is the radius or curvature of said surface and $\alpha$, the rolling angle.

Of course, the development of the curve representing the cross section of a surface 6 must be at least equal to $2R \sin \alpha_m$ if $\alpha_m$ is the maximum rolling angle admissible for this surface on either side of its main position.

If surfaces 6 roll through an angle $\alpha$, bodies 5 are inclined by said angle $\alpha$ and it can be seen that if $l$ designates the distance between the axes (or centers) O of the two surfaces 6 of a given body 5, plates 3 move toward each other by a distance equal to $l(1-\cos \alpha)$ and have with respect to each other, perpendicularly to this distance, a translatory displacement of an amplitude substantially equal to $(2R+l) \sin \alpha$ if the distance between the top of the upper surface 6 and the bottom of the lower surface 6 is greater than 2R and equal to (2R—l) sin α if this distance is smaller than 2R.

It may be advantageous to provide a resilient lateral connection between bodies 5 by interposing between them masses of rubber or an elastomer material 7 made adherent to the side walls of said bodies 5 turned toward each other.

These masses 7 may fill the whole of the spaces between said bodies, thus forming a single block with cushion elements 4.

On the contrary, empty spaces 8 may be provided to facilitate some deformations of the rubber material and to improve the flexibility of the system parallelly to the plates.

Of course, instead of being made practically rigid in the vertical direction, and deformable in the horizontal direction, the system according to this invention might be arranged to provide a horizontal connection which is rigid and a vertical connection which is deformable. It suffices in this case to dispose plates 3 vertically.

Figure 5:
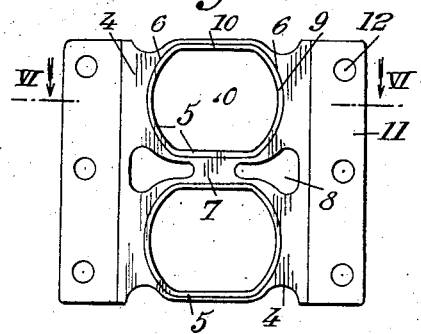
FIG. 5 shows another resilient connecting system according to the invention in elevational view, this system being in the state of rest.
Figure 7:
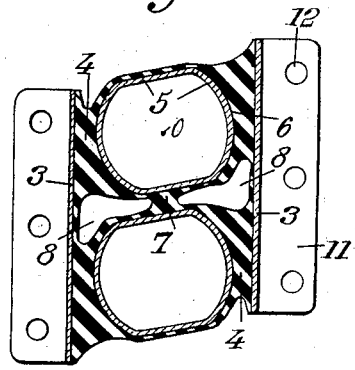
FIG. 7 shows the same system in vertical section in a deformed state.
Figure 6:
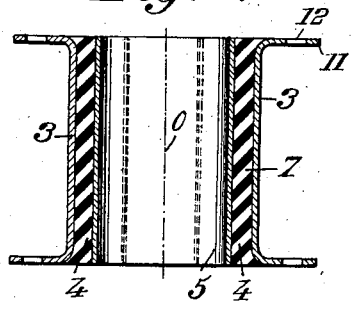
FIG. 6 is a sectional view on the line VI—VI of FIG. 5.

In preferred embodiment of the invention illustrated by FIGS. 5 to 7, bodies 5 are shaped in such manner that the two curved surfaces 6 of each of them have a common rolling axis (or center). In this case l is equal to 0 and when the plates move relatively to each other, the distance between them remains constant.

In this construction, bodies 5 advantageously consist of cylindrical "rollers" having each two curved walls 9 connected together by flat parallel wall elements 10: such an arrangement permits of obtaining both a great radius of curvature for surfaces 6 (and therefore relatively great displacements of one of the plates 3 with respect to the other for a given rolling angle) and a small dimension in the direction of these displacements.

In this construction plates 3 are provided along two of their edges with wings 11 provided with holes 12 for fixation of these plates by means of bolts or rivets on the parts to be connected together.

Figure 9:
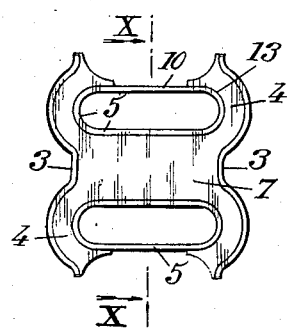
FIG. 9 is an elevational view of still another system according to the invention, in the state of rest.
Figure 10:
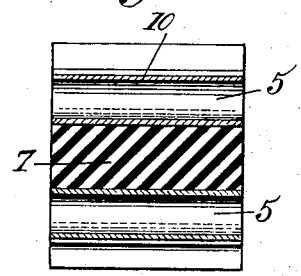
FIG. 10 is a vertical section on the line X—X of FIG. 9.

FIGS. 9 and 10 show another embodiment of the invention wherein the rigid bodies 5 are hollow sleeves comprising two flat parallel walls 10, joined together by end walls 13 each in the form of a half cylinder of revolution. As the curvature of these walls is relatively great, the portion of plate 3 located opposite side end walls are given a curved shape so that the thickness of rubber disposed said end walls and said plates remains substantially constant everywhere, which improves the guiding of bodies 5 during their displacements while reducing the amount of rubber that is necessary.

Figure 8:
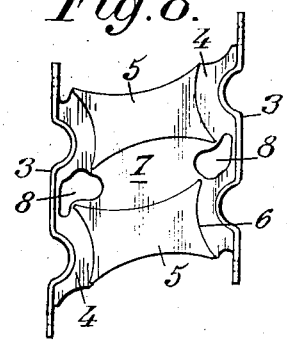
FIG. 8 is an elevational view of another system according to the invention, in a deformed state.

Instead of being convex, curved surfaces 6 may be concave. This is the case of the embodiment of FIG. 8.

In this case rolling is effected in such manner that the rolling axes (or centers) remain respectively fixed with respect to the corresponding plates, and if α is the rolling angle, l the distance between the axes (or centers) of every body 5 and R the radius of curvature of surfaces 6, the displacement of the plate toward each other is still l (1—cos α), whereas the amplitude of their relative displacement parallelly to the plates is substantially equal to l sin α.

It should be noted that, in this construction, to a given angle α there corresponds a relative displacement of great amplitude of the plates parallel to each other, due to the fact that l is relatively great.

As in the construction of FIGS. 9 and 10, the portions of plates 3 located opposite surfaces 6 are shaped so that the thickness of rubber between said plates and said surfaces is substantially constant.

FIG. 12 shows the application of this invention to a railway truck: at least two systems (3—4—5) as above described are interposed between on the one hand the central cross member 14 of the frame of this truck carried by wheel axles 15 and on the other hand its bolster 16 on which is resting the body 17 of the vehicle through elements 18, this body being guided by means of a pivot 19 having a vertical axis and rigid with said body, this pivot 19 cooperating with a bearing 20 carried by said bolster.

The use of a system according to the present invention achieves both a fixed vertical guiding of body 17 and a great flexibility of horizontal displacements combined with a substantial returning force and with a good absorption of the transmission of vibrations from the frame (and therefore of the axles) to the body.

FIG. 13 shows a power-hammer 24 the base 21 of which is supported by compression springs 22 whereas it is guided horizontally by means of systems 3—4—5 of the kind above described interposed between the vertical faces of the base and opposed vertical faces of a pit 23 provided in the ground.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. For use between two parts to be guided with respect to each other so that said parts may have relative displacements of small amplitude on either side of a mean relative position toward which they are urged resiliently while being kept at a constant distance from each other, a system for connecting said parts together in this manner and also for at least reducing the transmission of vibrations from one to the other, this system comprising, in combination, two rigid members secured in a fixed manner to said parts respectively, two cushion elements of a resilient material each made adherent to one of said members respectively, said cushion elements facing each other, and at least two hollow rigid bodies each interposed between said two cushion elements and having its end portions made adherent to said cushion elements respectively, said end portions being in the form of cylindrical wall elements belonging both to the surface of one cylinder of revolution the axis of which is located at mid-distance between said two rigid members, each of said bodies having two flat side wall elements joining said cylindrical wall elements with each other, said side wall elements being located in planes parallel to each other and to said axis, the side wall elements of the respective hollow rigid bodies being parallel to one another, whereby the displacements of one of said parts with respect to the other produce identical rolling movements of said rigid bodies.

2. A connecting system according to claim 1 further comprising masses of a resilient material, each interposed between the respective side wall elements of said two rigid bodies that face each other, and made adherent thereto.

References Cited in the file of this patent

UNITED STATES PATENTS 2,314,644    Adams et al.    Mar. 23, 1943
2,706,112    Carrier    Apr. 12, 1955